United States Patent Office 2,935,998
Patented May 10, 1960

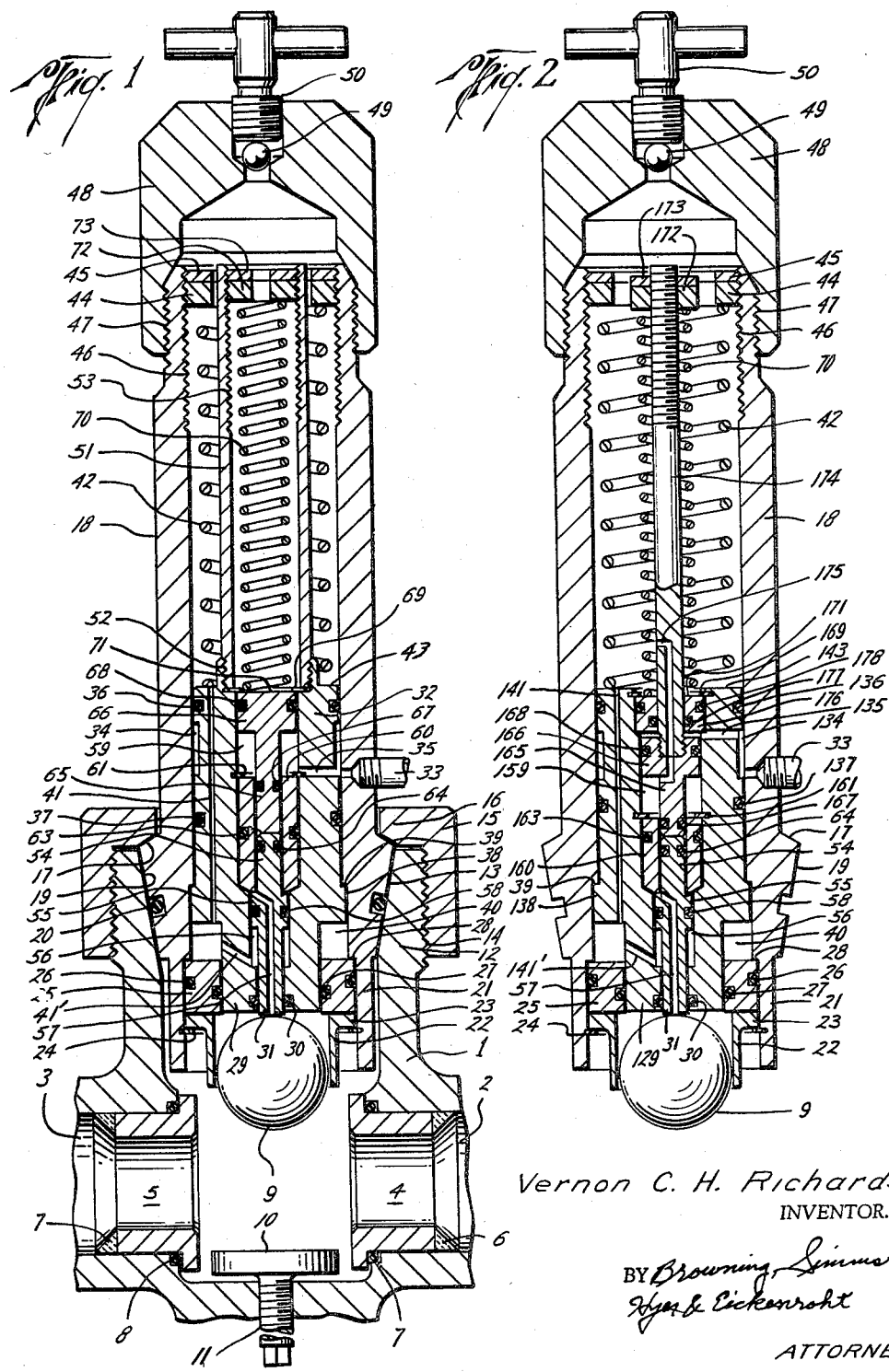

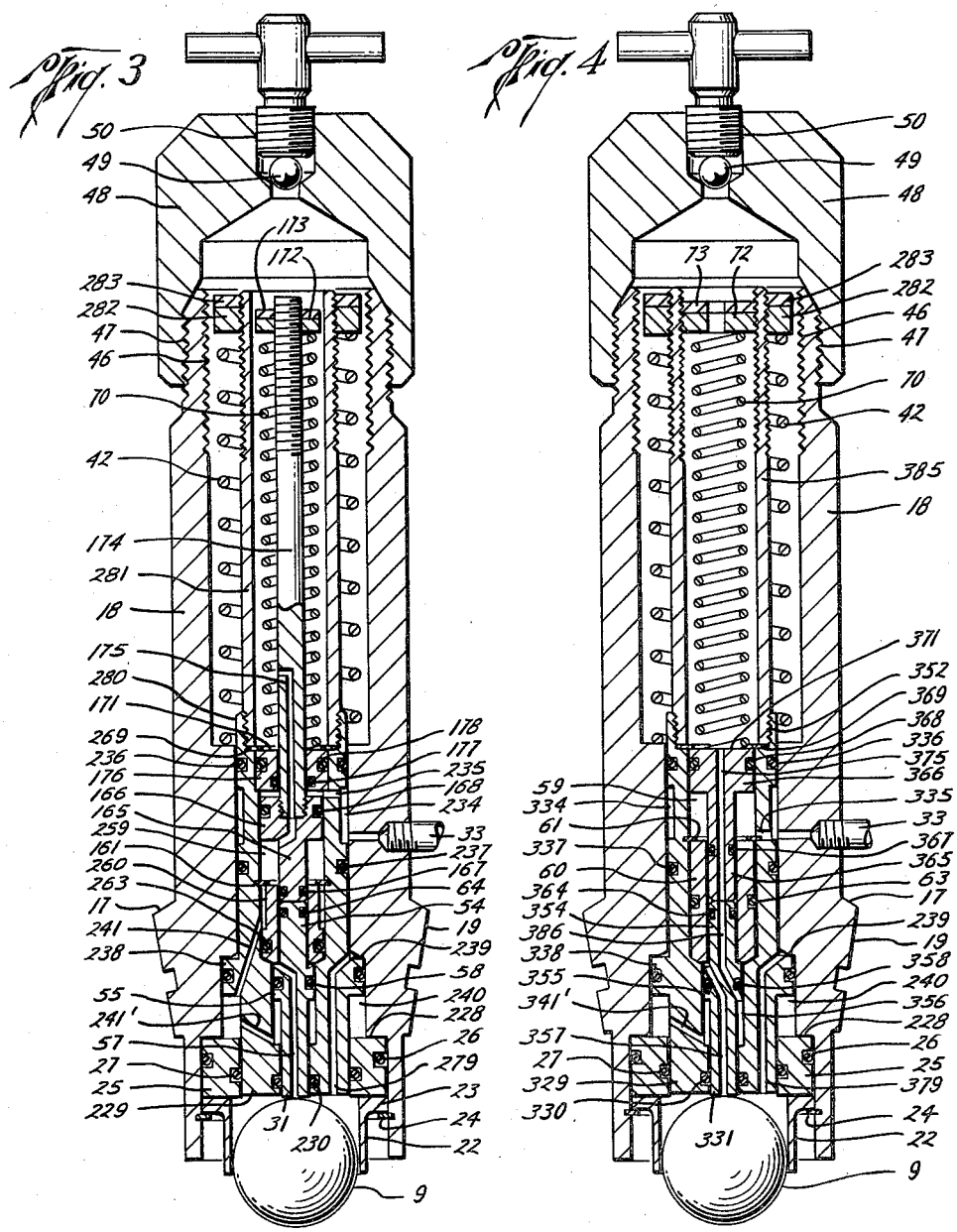

2,935,998

AUTOMATIC SHUT-OFF VALVE AND CONTROLS THEREFOR

Vernon C. H. Richardson, Houston, Tex., assignor to U.S. Industries, Inc.

Application September 19, 1957, Serial No. 684,995

9 Claims. (Cl. 137—458)

This invention relates to automatic valves adapted to be connected into a flow line and automatically operable alternatively by predetermined variations of pressure within the flow line or by predetermined variations of a pressure originating externally of the flow line. Automatic shutoff valves of this type which operate to shut off flow through the line upon predetermined variations of pressure within the flow line have been heretofore known. Likewise, such valves operable to shut off flow through the line upon predetermined variations of a pressure originating externally of the flow line have been heretofore known.

It is an object of this invention to provide such a valve which, in a single structure, will operate to shut off flow through the line either upon a given predetermined variation of pressure within the line or upon a predetermined variation with pressure originating externally of the line.

It is a further object to provide such a structure which will operate to shut off flow either when the pressure in the line falls below a predetermined value or when the pressure originating from an external source falls below a predetermined value A further object is to provide such a valve in which flow through the valve will be shut off either when pressure in the flow line falls below a predetermined value or when pressure originating from a source externally of the flow line exceeds a predetermined value.

Another object is to provide such a valve structure which will operate to shut off flow through the line either when pressure within the line exceeds a predetermined value or when a pressure originating externally of the line falls below a predetermined value.

One other object of this invention is to provide a valve of the character above mentioned in which the valve will operate to shut off flow therethrough either when the pressure in the line exceeds a predetermined value or when the pressure originating externally of the line exceeds a predetermined value.

Other objects and advantages of this invention will become apparent from the following description taken in connection with the accompanying drawing wherein are set forth by way of illustration and example four embodiments of this invention.

In the drawing:

Fig. 1 illustrates a valve constructed in accordance with this invention showing the same in longitudinal cross-section, the particular structure illustrated in this figure being one in which flow through the valve will be shut off whenever the pressure within the valve falls below a predetermined value or whenever the pressure from an external source controlling the valve falls below a predetermined value.

Fig. 2 is a view similar to the upper portion of Fig. 1 illustrating a modification which will operate to shut off flow through the valve either when pressure within the valve falls below a predetermined value or when a pressure originating from a source externally of the valve exceeds a predetermined value.

Fig. 3 is a view similar to Fig. 2 but illustrating a modification in which flow through the valve will be shut off either when the pressure within the valve exceeds a predetermined value or when the pressure from an external source applied to the valve control exceeds a predetermined value.

Fig. 4 is a view similar to Figs. 2 and 3 but illustrating a modification in which flow through the valve will be shut off either when pressure within the valve exceeds a predetermined value or when pressure from a source externally of the valve falls below a predetermined value.

As will presently appear, specific structures illustrated in the drawing by which the objects of this invention are achieved are such that many of the parts for the different modifications of the invention may be interchanged so that by merely removing certain parts and replacing them with others the operation of the valve may be altered.

It will also be apparent that by the particular arrangement illustrated in the drawing, the operating control parts of the valve are made substantially concentric with each other and substantially cylindrical in cross-section for the purpose of facilitating manufacture and assembly and reducing the cost.

For the sake of convenience, "non-actuating forces" will be used to designate those forces exerted on movable parts but always balanced by other forces so that they produce no movement, and "actuating forces" will be used to designate resultant forces which are at times unbalanced and cause movement.

Referring now in more detail to Fig. 1 in which an entire valve save for the flow line connection is illustrated, the valve body is shown at 1 and is provided with flow ports 2 and 3 either of which may be an inlet and the other an outlet port. Each of these ports is provided with a valve seat member 4 or 5 as the case may be and these are welded or otherwise secured in place as shown at 6 and 7, respectively. If desired, additional seals between the valve body and the valve seat members 4 and 5 may be provided by means such as seal rings 7 and 8.

The valve member for closing or shutting off flow through the valve is illustrated at 9 in the form of a ball which, when dropped into the line of flow between the ports 2 and 3, will be moved by any flow taking place through the valve so as to seat against the downstream seat 4 or 5 depending on the direction of flow through the valve. This will cause closure of the valve and prevent further flow therethrough. Provision for unseating the closure member 9 and moving it to inoperative position is provided in the form of a pusher 10 within the lower portion of the valve housing, carried upon a stem 11 which may be threaded through the valve housing or through some member secured thereto so that it may be moved into the valve housing and caused to shift the ball member 9 to the position illustrated.

The valve body 1 has a laterally extending part 12 surrounding the space in which the valve member 9 is shown retained in Fig. 1, this extension having a tapered seat 13 adapted to receive the valve control housing in a manner presently to be described, and a threaded external portion 14 designed to receive a retaining nut 15. This retaining nut has an inwardly extending flange 16 adapted to engage a shoulder 17 on the housing 18 of the control mechanism so as to tighten and retain this housing in place and seated against the tapered seat 13 of the valve body. For the purpose of providing this seat the housing 18 has a tapered outer surface 19 for engagement with the tapered portion 13, and has a groove in which is disposed a seal ring 20 adapted to seal against the tapered surface 13 in the valve body 1.

The control body 18 likewise has a downwardly extending skirt or flange 21 projecting into the space within the body 1 which is laterally disposed with respect to the line of flow between the inlet and outlet ports 2 and 3. A valve member retainer 22 having a laterally extending outer flange 23 at its upper end is secured within the skirt 21 by means of a split retaining ring 24. This retainer 22 serves to resiliently and releasably retain the valve member 9 until such time as it is forcibly ejected therefrom and thus allowed to move into the flow path between the ports 2 and 3 to close the valve.

Above the flange 23 is a cylinder head member 25 likewise slideably received within the skirt 21 and having seals 26 and 27 providing for the prevention of leakage respectively between the cylinder head 25 and the skirt 21 and between the cylinder head 25 and a plunger which will presently be described. This cylinder head is limited in its upward movement by engagement with a shoulder 28 at the upper end of the skirt 21.

The plunger within and passing through the cylinder head 25 has its lower end designated by the numeral 29 and it in turn has a central bore therethrough with a seal 30 therein surrounding a force transmitting plunger 31. The plungers 29 and 31 are preferably of circular cross-section and concentric with each other.

The body 32 of the plunger 29 extends upwardly within the housing 18 to a position substantially above the point of joinder to this housing of a conduit 33. This conduit 33 is adapted to be connected to a source of pressure external of the valve but which is subject to variations and upon predetermined variations is designed to cause closure of the valve.

The plunger 32 is movable upwardly and downwardly within the limit provided by the cylinder head 25 and the shoulder 39 and is provided on its external surface with a circumferential groove 34 of sufficient length and direction parallel to the axis of the plunger so that it will be at all times in communication with the pasageway from the conduit 33. Extending from this groove 34 radially into the interior of the plunger 32 is a radial passageway 35. Thus high pressure fluid from the conduit 33 will be at all times conducted into the interior of the plunger 32. For the purpose of preventing leakage of such high pressure control fluid either upwardly or downwardly between the plunger 32 and the body 18, the plunger 32 is provided with seal rings 36 and 37, respectively, located above and below this circumferential groove 34, these seal rings extending circumferentially about the plunger 32.

As shown by the numeral 38, the plunger 32 intermediate its ends is provided with an enlarged radially extending part the lower surface of which provides an abutment for engagement with the cylinder head 25 to limit downward movement of the plunger and the upper surface of which provides an abutment for engagement with the shoulder 39 to limit upward movement of the plunger. Below the piston-like enlargement just described is a space within the cylindrical bore of the housing 18, which bore is in communication through a passageway 41 with a space within the housing 18 above the plunger 32, this space being maintained at atmospheric pressure. Hence, the space 40 will likewise be at atmospheric pressure.

The plunger 32 is biased in a downward direction toward the interior of the valve housing by means of a spring 42 which bears at 43 on the upper end of the plunger 32 and which is held downwardly at its upper end by means of a nut 44 and lock nut 45 threaded into the upper end of the housing 18 in threaded engagement with the threads 46 interiorly of this housing.

The upper end of the housing 18 is also threaded exteriorly at 47 to receive a closure 48 which closes the upper end of the housing. The closure has a passageway through it so that the pressures inside and outside of the housing may be equalized, this passageway being subject to closure by means of a ball valve 49 which may be tightened in place by a screw 50.

To the upper end of the plunger 32 there is also secured an upwardly extending sleeve 51 threaded at 52 to the upper end of the plunger and extending upwardly within the spring 42. The upper end of this sleeve is interiorly threaded from the upper end as shown in 53 for a purpose presently to be described.

The plunger 31, the lower end of which projects through the bore in the lower end of the plunger 32 and is exposed to the interior of the valve housing and adapted on downward movement toward the valve housing to displace the ball valve 9 and cause it to move to valve closing position, has an upward extension 54 and an intermediate laterally enlarged portion 55. The portion 54 is substantially the same cross-sectional area as the lower end portion which is exposed to the interior of the valve housing while the laterally enlarged portion 55 forms a piston whose exposed upper and lower surfaces are substantially the same area as the exposed lower end of the plunger which is exposed to the interior of the valve housing. This laterally enlarged portion 55 is disposed within a cylindrical bore 56 which is actually a counterbore within the plunger 32. The space 56 below the piston-like enlargement 55 is connected by means of a passageway $41^1$ to the space 40 previously mentioned, which is maintained at substantially atmospheric pressure, so that the space 56 likewise will be maintained at substantially atmospheric pressure.

Extending upwardly from the lower end of the plunger 31 is a passageway 57 which provides communication between the interior of the valve housing and the space above the piston-like enlargement 55. In view of the equality of areas of the lower end of the plunger and of the exposed upper surface of the piston-like enlargement it will be seen that the effect of the valve housing pressure on the plunger 31 will be equalized and will have no effect tending to move the plunger upwardly or downwardly. Leakage past the piston-like enlargement 55 is prevented by the seal ring 58 which surrounds this enlargement and forms a seal against the walls of the cylindrical opening 56.

Within its upper end portion the plunger 32 is provided with a cylindrical bore 59 of somewhat larger diameter than the cylinder 56 and extending downwardly to the upper end of the cylinder 56. The lower portion of this bore has disposed therein a sleeve 60 held in place by means of a split retainer ring 61 and provided with a seal against the wall of the cylinder 59 by means of a seal ring 63 located intermediate the ends of the sleeve 60. This sleeve has a bore through it of a size to receive the upper end of the plunger 31 and a seal between the bore of the sleeve 60 an the upper end of the plunger 31 is provided by means of a seal ring 64.

A reduced lower end portion 65 of the same diameter as the upper end portion 54 of the plunger 31 is provided on a remote low pressure power piston 66 and is located in the bore 59 above the sleeve 60. This extension 65 of the plunger 66 is provided with a seal 67 thereabout for sealing it within the sleeve 60 likewise. The upper end of the plunger 66 is also provided with a seal ring 68 extending thereabout for providing a seal between it and the wall of the cylinder 59. The upward travel of the plunger 66 is limited by a split retainer ring 69 and this plunger is normally biased in a downward direction by means of a spring 70. The spring 70 bears at its lower end on the upper surface 71 of the plunger 66 and is held at its upper end by means of adjusting nut 72 and lock nut 73 threaded into the threaded interior 53 of the sleeve 51.

It will be clear that the pressure existing within the valve body 1 will act upon the lower surface of the plunger 32 in a direction contrary to the bias provided on said plunger by the spring 42 and that as long as such pressure exceeds the value necessary to keep the spring 42 compressed and overcome it, the plunger 32 will be held against the shoulder 39 and the valve will remain open in the position illustrated. However, if and when the pressure within the valve body 1 drops below that necessary to overcome the spring 42, the spring 42 will act upon the plunger 32 to move it downwardly and this downward movement will carry with it the sleeve 60 and the plunger 31 as well as the plunger 66, thereby forcing the valve member 9 out of the resilient retaining means 22 and causing it to move into the path of flow through the valve thereby closing the valve.

On the other hand, a suitable control pressure from a source exterior of the valve housing will be admitted through the conduit 33 and into the space within the cylinder 59 beneath the piston 66. Pressure within the upper part of the housing 18, which may be atmospheric will act on the upper surface 71 of the plunger 66 and also will act through passages 41 and 41¹ on the lower surface of the enlargement 55. Since such lower surface is equal in area to the cross sectional area of the stem 54 and also to that of the stem 65, the effect of the force exerted by this pressure on the lower surface of the enlargement 55 will be to counterbalance part of the force exerted by the same pressure on the surface 71. The part counterbalanced will be equal to the force which the same pressure would exert if acting only on the area of cross section of the stem 65. Therefore, the resultant of all forces exerted by the pressure within housing 18 acting on the plungers 54 and 66 will be the same as though that pressure acted on only a portion of the surface 71 equal in area to the downwardly facing annular surface of plunger 66 exposed to the interior of the bore 59. This unbalanced portion of the force exerted by pressure within the housing 18 will be combined with the force exerted by the spring 70 to urge the plunger 66 downwardly. The differential between the sum of these and the force exerted by the control pressure constitutes a variable actuating force. As long as this external control pressure is of a value sufficient to overcome the force of the spring 70 plus a force equal to the pressure in housing 18 multiplied by the area of the surface 71 minus the area on the lower end of the enlargement 55, this piston 66 will be retained by the differential actuating force in its upper position as illustrated. However, in the event this control pressure should fall below the predetermined minimum necessary to overcome the spring 70 and the unbalanced portion of the force exerted on plunger 66 by the pressure within the housing 18, this spring and the pressure within the housing 18 will provide a differential actuating force which will move the piston 66 downwardly within the cylinder 59. Piston 66 will in turn transmit this actuating force to the upper end of the plunger 31 and move it downwardly, thereby dislodging the valve member 9 from its retained position and moving it into the flow stream through the valve causing the closure of the valve. Thus the valve will automatically be closed either when the control pressure of the fluid within the valve itself drops below a predetermined minimum or when the control pressure originating exteriorly of the valve drops below a predetermined minimum.

Referring now to the form illustrated in Fig. 2, it will be seen that the valve member and retainer and the housing for the control mechanism are identical with those described in connection with Fig. 1, as is also the plunger 31. The valve body 1 and the parts associated therewith but not carried by the operating mechanism housing 18 have been omitted from Fig. 2 but it will be understood that they may be identical with those illustrated in Fig. 1. Other parts which are similar in structure or function to corresponding parts in Fig. 1 but not identical therewith have been given similar numbers with the digit 1 prefixed thereto. Thus the plunger 129 is quite similar to the plunger 29 differing therefrom only in such minor respects as necessary to make this plunger cooperate with the plunger 166 which is employed in place of the plunger 66 of Fig. 1. It has a circumferential groove 134 therein adapted to receive external control pressure fluid from the conduit 33 and transmit it through a radial passageway 135 to the interior of the plunger 129. It has a seal ring 136 above and a seal ring 137 below the circumferential groove 134 for the purpose of preventing leakage of such control pressure fluid upwardly or downwardly between the plunger 129 and the housing 18. It also has a lateral enlargement 138 having an upwardly facing shoulder providing a stop against the shoulder 39 of the housing 18 and a downwardly facing shoulder exposed to the space 40 and adapted to provide a stop against downward movement of the plunger 129 by engagement with the upper surface of the cylinder head 25. The space 40 is connected by a passageway 141 to the upper portion of the housing 18 wherein substantially atmospheric pressure prevails thereby maintaining the space 40 at substantially atmospheric pressure also. The space 40 is connected by means of a passageway 141¹ through the plunger 129 with the space 56 so that the space 56 below the piston 55 will likewise be maintained at substantially atmospheric pressure. This plunger is held down in substantially the same manner as the plunger 29 by means of a spring 42 anchored in the same fashion as before and bearing against the upper surface 143 of the plunger 129. However, this plunger does not have the upwardly extending sleeve 51 which is carried in Fig. 1.

As in the case of the plunger 29, the plunger 129 has a counterbore from its upper end providing a cylindrical space 159, the lower portion of which is occupied by a sleeve 160, held in position in the lower portion of the counterbore by means of a split retainer ring 161. A seal is provided between this sleeve and the wall of the counterbore 159 by means of a seal ring 163 surrounding the sleeve. The upper portion 54 of the plunger 31 is sealed within the sleeve 160 by means of a seal ring 64 as in the case of Fig. 1.

Located within the counterbore 159 is a remote high pressure plunger 165 having a lateral enlargement 166 on its upper end providing a piston. This plunger has its lower end of the same cross-section as the upper end portion of the plunger 31 and sealed within the sleeve 160 with a sliding seal by means of a seal ring 167. Similarly, a seal ring 168 provides a sliding seal between the piston 166 and the wall of the counterbore 159.

Extending upwardly from the piston 166 and threadedly engaged therewith so as to move therewith at all times is a stem 174 which on its upper end carries an adjusting nut 172 and a lock nut 173 holding the spring 70 in compression against the upper surface 171 of a cylinder head member 176 disposed within the upper end of the counterbore of the plunger 129. This cylinder head member is held in place by means of a split retainer ring 169 and is provided with a sliding seal with respect to the stem 174 by means of a seal ring 177, and is provided with a seal 178 against the interior of the counterbore. Pressure existing within housing 18 exerted on stem 174 is transmitted through piston 165 to the upper end of plunger 54 to provide a non-actuating force balancing that on the lower surface of enlargement 55. A passageway 175 within the stem 174 serves to provide communication between the interior of the upper portion of the housing 18 and the space 159 below the piston 166 so that this space will be maintained at substantially atmospheric pressure the same as the space within the upper portion of the housing 18.

It will readily be perceived that the structure illustrated in Fig. 2 will operate in the same fashion as that illustrated in Fig. 1 insofar as its reactions to variations of pressure within the valve housing are concerned. Thus, when the pressure within the valve housing is above a predetermined minimum it will act upon the lower surface of the plunger 129 and overcome the force of the spring 42 to maintain the plunger 129 in its uppermost position but when this pressure drops below the predetermined minimum the spring 42 will move the plunger 129 downwardly bringing with it the piston 166, the sleeve 160 and the plunger 31 thereby dislodging the valve member 9 and causing it to move into valve closing position.

On the other hand, the control pressure from an external source applied through the conduit 33 will act downwardly on the piston 166 and so long as this control pressure does not exceed a predetermined maximum it will not overcome the spring 70 which urges the piston 166 in an upward direction at all times and the resultant actuating force will hold the piston 166 in its upper position. However, when the externally originating control pressure exceeds a predetermined maximum it will act upon the piston 166 with such force as to overcome the spring 70 and provide a resultant actuating force which the plunger 165 will apply to the upper end of the plunger 31 and move it downwardly to dislodge the valve member 9 and move it into valve closing position.

Referring now to Fig. 3, it will be seen that all of the parts illustrated are substantially the same as those shown in Fig. 2 both in structure and function with the exception that the plunger 229 is somewhat different from the plunger 129 and operates under different circumstances so that instead of causing the closing of the valve when the pressure within the valve body drops below a predetermined value, it will cause closing of the valve when this pressure rises above a predetermined maximum.

The lower portion of the plunger 229 is sealed within the valve housing at the point where it passes through the cylinder head 25 by means of a seal ring 27 the same as in the previously described form. It has a seal ring 230 surrounding the lower end of the plunger 31 to provide a sliding seal about that plunger also. Likewise, at the point where the connection from the conduit enters the housing 18 the plunger 229 is provided with a circumferential groove 234 and it has a radial passageway 235 connecting this circumferential groove with the counterbore in the upper portion of the plunger 229. Above the circumferential groove 234 the plunger 229 is provided with a sliding seal 236 and below such groove a sliding seal 237 for the purpose of preventing leakage of pressure fluid entering through the conduit 33 from taking place between the plunger 229 and the body 18. This plunger is provided with an enlarged portion 238 providing a piston the upper surface of which forms a shoulder opposed to the shoulder 239 in the housing 18. Below this piston 238 within the housing 18 is a cylindrical space in which the piston 238 is adapted to reciprocate and this space is provided with substantially atmospheric pressure through a passageway 241 extending through the plunger 229 into communication with the counterbore of the plunger which which is kept at substantially atmospheric pressure in a manner presently to be described. A passage 241¹ extending in a general radial direction through the plunger 229 connects the space 240 with the counterbore within the plunger in which the piston 55 reciprocates so that the space below this piston is likewise maintained at substantially atmospheric pressure.

The plunger 229 is in this instance biased toward its uppermost position by means of a spring 42 which bears at its lower end against the shoulder within the housing 18 and at its upper end abuts an adjusting nut 282 which is locked in place by a lock nut 283, both being threaded on the upper outer portion of the sleeve 281 carried by the plunger 229.

The pressure of fluid within the valve body acts upon the lower surface of the plunger 229 tending to urge it upwardly, but through the passageway 279 it also acts upon the upper surface of the piston 238. This piston 238 has its upper surface so deisgned as to exceed in area the lower area of the plunger 229 so that the resultant effect of the pressure within the valve body is to cause this plunger to move downwardly. When this resultant effect exceeds the strength of the spring 42 so as to overcome this spring, this plunger will move downwardly and will move with it the piston 166 and the plunger 31 thereby dislodging the valve member 9 from its retainer 22 and causing it to move to valve closing position. Opposed to this tendency, of course, is not only the spring 42 but also the action of atmospheric pressure in the space 240. This atmospheric pressure is derived from that existing within the upper portion of the housing 18, passing therefrom through the passageway 175 in the stem 174 of the piston 166 and into the space 259. Thence it passes through the passageway 241 into the space 240 and thence through the passageway 241¹ into the space below the piston 55.

The operation under the action of the control pressure derived from an external source is the same as that illustrated in Fig. 2, namely that so long as this pressure which acts upon the upper surface of the piston 166 is insufficient to overcome the strength of the spring 70 which biases this piston upwardly, the piston will remain in its uppermost position as illustrated. However, when this control pressure exceeds a predetermined maximum it will overcome the spring 70 and move this piston downwardly along with the plunger 31 to dislodge the valve member 9 and close the valve.

Turning now to Fig. 4, all of the parts are quite similar in their form and function to those illustrated in Fig. 3 with the exception that a piston arrangement 366 is provided which is substantially comparable to that of the piston arrangement 66 in Fig. 1, and a slightly different arrangement is provided for conducting atmospheric pressure to the space below the piston 355 than that which is provided for providing atmospheric pressure below the piston 55 in the previously described forms.

Thus the plunger 329 is sealed within the cylinder head 25 by means of seal ring 27 as in the previous forms. Likewise, it is provided with a seal 330 for sealing about the plunger 331 in substantially the same fashion as the seal 30 previously described sealed about the plunger 31.

The plunger 329 adjacent its upper end is provided with a circumferential groove 334 receiving fluid under pressure from the conduit 33 and causing it to communicate through a substantially radial passageway 335 with the counterbored interior of the plunger 329. The seal rings 336 and 337 are provided above and below the groove 334 respectively for the purpose of preventing escape of the pressure fluid entering through the conduit 33 to the space between the plunger 329 and the body 18.

The plunger 329, as in the case of plunger 229, has a laterally enlarged portion 338 forming a piston located within the lower counterbore of the body 18 and designated by the numeral 240, this piston being movable upwardly and downwardly within this counterbore and stopped in its upward movement by the shoulder 239 and in its lower movement by the upper surface of the cylinder head 25.

Within the upper portion of the plunger 329, it is formed with a counterbore which is connected to the space 240 by a pasageway 341¹.

The plunger 329, as in the case of the plunger 229 in Fig. 3, is biased toward an upward position by means of spring 42 which bears at its lower end upon a shoulder in the interior of the housing 18 and at its upper end is retained by adjusting nut 282 and lock nut 283 threaded on to the exterior of the upwardly extending sleeve 385 threadedly connected to the plunger 329 as shown at 352.

The upper portion of the plunger 331 is shown at 354 as disposed within the sleeve 60 carried within the lower portion of the counterbore 59 in the plunger 329 and held therein by a split retaining ring 61. This sleeve is also sealed within the plunger 329 by means of a seal ring 63 so as to prevent the escape of pressure between these two parts.

The plunger 331 below the portion 354 has a laterally enlarged portion providing piston 355 below which is a counterbore space 356 within which the piston 355 is adapted to reciprocate. The plunger 331 has a passageway 357 extending upward at its lower end and opening into the space above the piston 355 so that pressure from within the valve body acts not only on the lower end of the plunger 331 but upon the upward exposed surface of the piston 355 which is of the same area as that of the lower end of the plunger exposed to the interior of the valve body. Thus the effect of pressure within the valve body will be balanced upon the plunger 331 and will not tend to move it upwardly or downwardly. Escape of pressure past the piston 355 is prevented by a seal ring 358 surrounding this piston.

The upper end of the plunger 331 is also provided with a sliding seal within the sleeve 60 by means of the seal ring 364. The lower end 365 of the plunger 366 is mounted within the same sleeve just above and in contact with the upper end of the plunger 331. It is provided with a sliding seal within this sleeve by means of the seal ring 367 and seal ring 368 provides a sliding seal between the piston 366 and the counterbore of the plunger 329.

At its upper end the plunger 329 is provided with a split retaining ring which serves as an abutment for the upward movement of the piston 366 and limits such movement. This piston 366 is biased in a downward direction by means of spring 70 and is urged in an upward direction by control pressure entering through the conduit 33 from an external source.

Atmospheric pressure from the upper portion of the housing 18 is passed downwardly through passageway 375 in the piston 366, from whence it connects with a passageway 386 extending downwardly through the upper portion of the plunger 331 to communicate with the space 356 below the piston 355.

Also there is a passageway 379 extending upwardly from the lower end of the plunger 329 and communicating with the upper surface of the piston 338 on said plunger so that the pressure within the valve body acts upon the lower face of the plunger 329 and also upon the upper face of the piston 338. The piston 338 is made with an exposed area on its upper surface which is greater than that of the lower surface of this plunger so that the action of fluid within the valve body tends to move the piston downwardly.

From the foregoing it will be seen that pressure within the valve body acting upon the plunger 329 tends to move it downwardly against the bias provided by the spring 42 and that when this pressure exceeds a predetermined maximum it will overcome the spring 42 and force the plunger 329 downwardly. The same will carry with it the plungers 366 and 331 and dislodge the valve member 9 to close the valve.

On the other hand, the control pressure from an external source that runs through the conduit 33 will act upon the lower surface of the piston 366 tending to urge it upwardly against the bias provided by the spring 70. As long as this pressure is great enough to overcome the spring 70 the piston 366 will be maintained in its uppermost position but in the event this external control pressure should fall below a predetermined minimum it will cease to overcome the spring 70 and the spring 70 will thereupon force the piston 366 and the plunger 331 downwardly to unseat the valve member 9 and close the valve.

Inasmuch as all the plungers in each figure are concentric with each other, any pressure applied by one plunger to another or by fluid pressure to an endwise facing surface of a plunger will be balanced about the axis of the plunger to which the pressure is applied so as not to tend to tilt it.

From the foregoing it will be seen that means have been provided for carrying out and accomplishing all of the objects and advantages of this invention.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth as shown in the accompanying drawing is to be interpreted as illustrative and not in a limiting sense.

The invention having been described, what is claimed is:

1. In an automatic shut-off valve having a body with a flow passage therethrough and a valve seat surrounding said passage and a space therein laterally of the flow passage and outside the direct flow path, and a valve member disposed in said space when the valve is open and movable therefrom into said direct flow path, said valve member being conformed to said valve seat to seat thereon and obstruct flow through the valve when moved into said direct flow path, the combination therewith of a plunger having one end movable into said space to move said member therefrom toward said flow path and having said one end exposed to the pressure of fluid existing in said space to urge it out of said space, having an oppositely facing surface of an area substantially equal to that of said one end and means for applying to said oppositely facing surface the pressure of fluid in said space to balance the effect of such pressure on said plunger, and said plunger having a second oppositely facing surface, means sealing off said second oppositely facing surface from exposure to said pressure, and a plurality of plungers movable toward and away from said space and alternatively operable on movement toward said space to engage said second oppositely facing surface in substantial balance about the axis of said first mentioned plunger and move said first mentioned plunger into said space, means for applying one control pressure to one of said plurality of plungers and another control pressure to the other of said plurality of plungers so that said control pressures tend to urge said plurality of plungers, respectively, each in one of the directions in which it is capable of moving, and biasing means acting on each of said plungers tending to move it in the direction opposite to the direction in which the control pressure tends to move it.

2. The valve as set forth in claim 1, in which the control pressures to which said plurality of plungers respectively are exposed are the pressure of fluid in said space and a pressure from a source externally of said valve.

3. The valve as set forth in claim 2, in which one of said control pressures is applied to its plunger in a direction away from said space so that when said pressure falls to less than a predetermined value the bias on its plunger will cause it to force said first mentioned plunger into said space and move said member into the flow passage.

4. The valve as set forth in claim 2, in which one of said control pressures is applied to its plunger in a direction toward said space so that when said pressure increases to more than a predetermined value it will overcome the bias on its plunger and cause it to force said first mentioned plunger into said space and move said member into the flow passage.

5. The valve as set forth in claim 2, in which one of said control pressures is applied to its plunger in a direction away from said space so that when said pressure falls to less than a predetermined value the bias on its plunger will cause it to force said first mentioned plunger into said space and move said member into the flow passage, and the other of said control pressures is applied to its plunger in a direction toward said space so that when said other pressure increases to more than a predetermined value it will overcome the bias on its plunger and cause it to force said first mentioned plunger into said space and move said member into the flow passage.

6. The valve as set forth in claim 2, in which both of said control pressures are applied to their plungers, respectively, in a direction away from said space so that when either of said control pressures falls to less than a predetermined value, the bias on its plunger will cause it to force said first mentioned plunger into said space and move said member into the flow passage.

7. The valve as set forth in claim 2, in which both of said control pressures are applied to their plungers, respectively, in a direction toward said space so that when either of said control pressures increases to more than a predetermined value it will overcome the bias on its plunger and cause it to force said first mentioned plunger into said space and move said member into the flow passage.

8. In an automatic shut-off valve having a body with a flow passage therethrough and a valve seat surrounding said passage and a space therein laterally of the flow passage and outside the direct flow path, and a valve member disposed in said space when the valve is open and movable therefrom into said direct flow path, said valve member being conformed to said valve seat to seat thereon and obstruct flow through the valve when moved into said direct flow path, the combination therewith of a plunger having one end movable into said space to move said member therefrom toward said flow path and having said one end exposed to the pressure of fluid existing in said space to urge it out of said space, having an oppositely facing surface of an area substantially equal to that of said one end and means for applying to said oppositely facing surface the pressure of fluid in said space to balance the effect of such pressure on said plunger, having another oppositely facing surface, and having a fourth surface facing in the same direction as said one end and equal in area to said other oppositely facing surface, means sealing off said other oppositely facing surface and said fourth surface from exposure to the pressure in said space, means for applying a variable force to said other oppositely facing surface in substantial balance about the axis of said plunger in a direction to move said plunger into said space, said last means including a member having a surface at least equal in area to the area of said other oppositely facing surface and so disposed that fluid pressure thereon will exert its force on said other oppositely facing surface, and means for connecting said surface of said member with said fourth surface of said plunger, whereby the fluid pressure on said fourth surface will be balanced by the same fluid pressure on an area equal to that of said other oppositely facing surface.

9. The valve as set forth in claim 8, in which said force applied to said fourth surface is produced by atmospheric pressure.

References Cited in the file of this patent

UNITED STATES PATENTS

| 2,635,626 | Meynig | Apr. 21, 1953 |
| 2,667,890 | Meynig | Feb. 2, 1954 |
| 2,834,371 | Liljestrand | May 13, 1958 |